(12) United States Patent
Schieman et al.

(10) Patent No.: US 10,567,416 B2
(45) Date of Patent: Feb. 18, 2020

(54) MONITORING THE SECURITY STRENGTH OF A CONNECTION

(71) Applicant: BlackBerry Limited, Waterloo (CA)

(72) Inventors: Adam Richard Schieman, Toronto (CA); Sue Hsiu Ying Ludwig, Mississauga (CA); Jason Scott Loustel, Mississauga (CA)

(73) Assignee: BlackBerry Limited, Waterloo, Ontario (CA)

( * ) Notice: Subject to any disclaimer, the term of this patent is extended or adjusted under 35 U.S.C. 154(b) by 186 days.

(21) Appl. No.: 15/335,365

(22) Filed: Oct. 26, 2016

(65) Prior Publication Data

US 2018/0115579 A1    Apr. 26, 2018

(51) Int. Cl.
*G06F 11/00* (2006.01)
*H04L 29/06* (2006.01)

(52) U.S. Cl.
CPC ................. *H04L 63/1433* (2013.01)

(58) Field of Classification Search
CPC ............ H04L 63/1433; H04L 63/0823; H04L 63/0428; H04W 12/12; H04W 12/06; H04W 12/02

USPC .......................................................... 726/25
See application file for complete search history.

(56) References Cited

U.S. PATENT DOCUMENTS

| 2003/0030680 | A1* | 2/2003 | Cofta | H04L 63/105 715/864 |
| 2010/0263019 | A1* | 10/2010 | Lemberg | H04L 63/164 726/1 |
| 2014/0096198 | A1* | 4/2014 | Brunson | H04L 63/0281 726/4 |
| 2016/0373263 | A1* | 12/2016 | Zaidi | H04L 9/3268 |
| 2017/0289137 | A1* | 10/2017 | Pendarakis | H04L 63/0823 |

* cited by examiner

*Primary Examiner* — Mohammad W Reza
(74) *Attorney, Agent, or Firm* — Fish & Richardson P.C.

(57) ABSTRACT

Systems, methods, and software can be used to monitor the security strength of a connection. In some aspect, a request to connect to an application server is received from a client application operating on an electronic device. In response to the request, a connection between the electronic device and the application server is initiated. A security strength level associated with the connection is determined. A notification indicating the security strength level of the connection is generated.

11 Claims, 5 Drawing Sheets

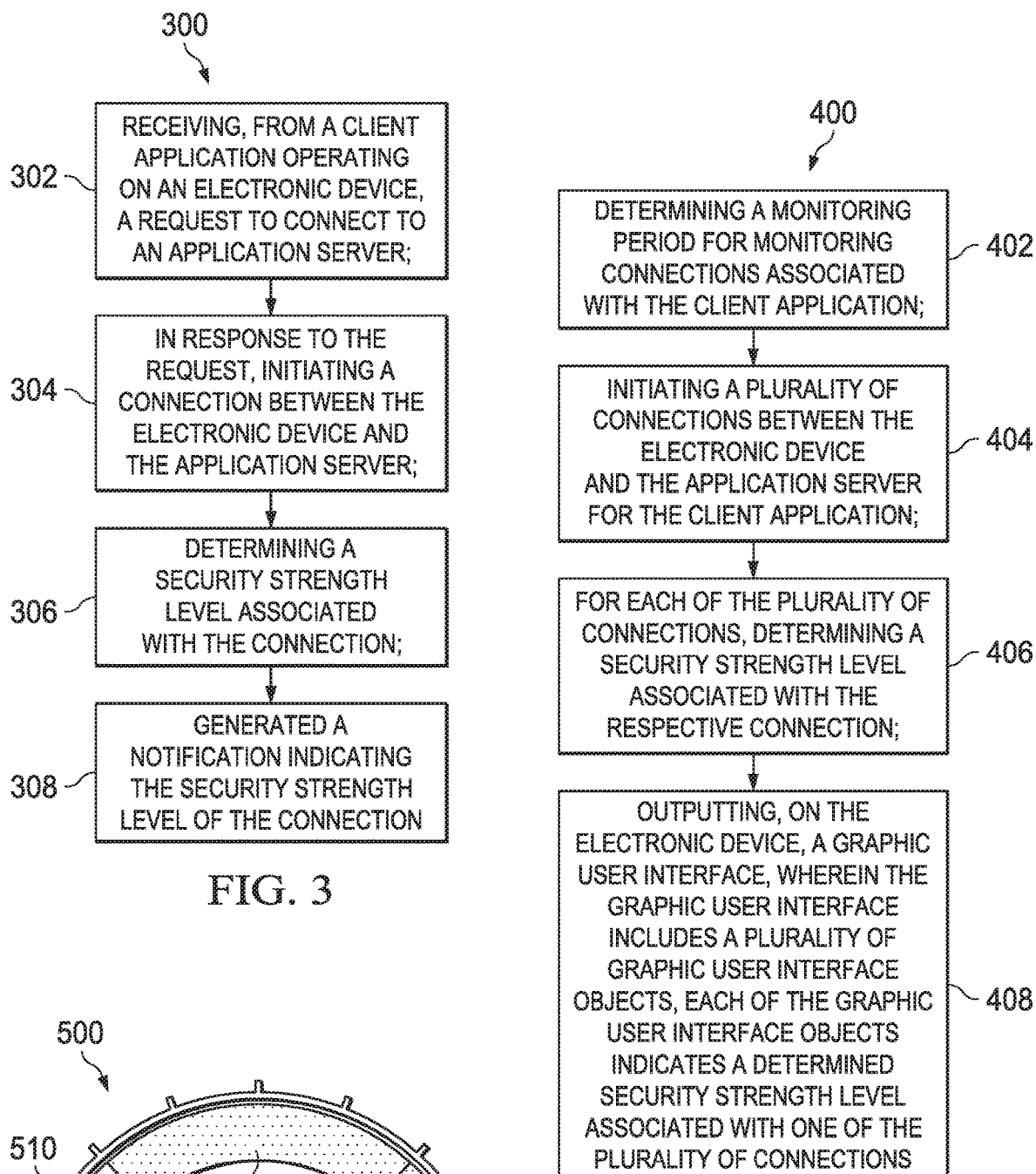
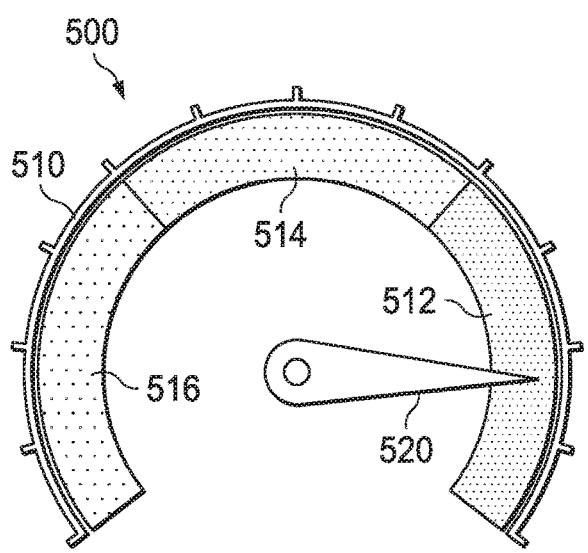

MONITORING THE SECURITY STRENGTH OF A CONNECTION

BACKGROUND

The present disclosure relates to monitoring the security strength of a connection. In some cases, electronic devices, including mobile devices, or other computer systems, can connect to a server over a network. The server can provide service to one or more applications executing on the electronic device.

DESCRIPTION OF DRAWINGS

FIG. 3 is a flow diagram showing an example process for monitoring the security strength of a connection according to an implementation.

FIG. 4 is a flow diagram showing an example process for monitoring the security strengths of connections made in a monitoring period according to an implementation.

FIG. 5 illustrates an example GUI object indicating the security strength level according to an implementation.

Like reference numbers and designations in the various drawings indicate like elements.

DETAILED DESCRIPTION

In some cases, an electronic device can receive services from a server through a browser. For example, a service request can be initiated by a browser executing on the electronic device. The service request can be sent to the server to establish a communication channel. The browser can obtain services from the server over the communication channel. In some cases, a security procedure can be performed before establishing the communication channel. For example, the browser may validate the certificate of the server before the communication channel can be established. In some cases, the browser can be configured to display an indication that indicates the type of certificate provided by the server. The indication can be displayed on the Uniform Resource Locator (URL) bar in the browser.

In some cases, instead of using a browser, the electronic device can use a client application to obtain the service from an application server. When executed on the electronic device, the client application can initiate a connection to the application server and obtain services.

In some implementations, a security strength level of the connection between the client application and the application server can be determined. A notification can be generated and outputted on the electronic device to indicate the security strength level. In some cases, security strength levels of one or more connections in a monitoring period can be recorded and outputted on the electronic device for a user to review. FIGS. 1-8 and associated descriptions provide additional details of these implementations.

Figure 1:
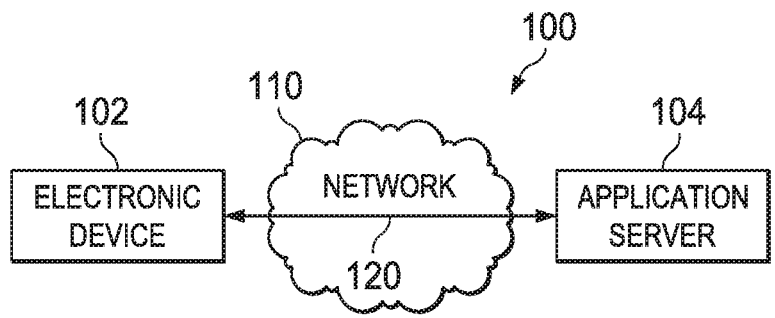
FIG. 1 is an example communication system that monitors the security strength of a connection according to an implementation.

FIG. 1 is an example communication system 100 that monitors the security strength of a connection according to an implementation. At a high level, the example communication system 100 includes an electronic device 102 and an application server 104. As shown in FIG. 1, the electronic device 102 and the application server 104 are communicably coupled over a connection 120 through a network 110.

The application server 104 represents an application, set of applications, software, software modules, hardware, or any combinations thereof that can be configured to provide services to a client application operating on the electronic device 102. In some implementations, the electronic device 102 and the application server 104 can establish the connection 120 using one or more security protocols. The application server 104 can provide services to the client application on the electronic device 102 using the connection 120. FIGS. 3-8 and associated descriptions provide additional details of these implementations.

The example communication system 100 includes the network 110. The network 110 represents an application, set of applications, software, software modules, hardware, or combination thereof that can be configured to connect the electronic device 102 and the application server 104. The network 110 includes a wireless network, a wireline network, or a combination thereof.

For example, the network 110 can include one or a plurality of Radio Access Networks (RANs), Core Networks (CNs), and external networks. The RANs may comprise one or more radio access technologies. In some implementations, the radio access technologies may be Global System for Mobile communication (GSM), Interim Standard 95 (IS-95), Universal Mobile Telecommunications System (UMTS), Code Division Multiple Access (CDMA2000), Evolved Universal Mobile Telecommunications System (UMTS), Long Term Evaluation (LTE), or LTE-Advanced. In some instances, the core networks may be evolved packet cores (EPCs). A RAN is part of a wireless telecommunication system which implements a radio access technology, such as UMTS, CDMA2000, 3GPP LTE, and 3GPP LTE-A. In many applications, a RAN includes at least one base station. A base station may be a radio base station that may control all or at least some radio-related functions in a fixed part of the system. The base station may provide radio interface within their coverage area or a cell for a mobile device to communicate. The base station may be distributed throughout the cellular network to provide a wide area of coverage. The base station directly communicates to one or a plurality of mobile devices, other base stations, and one or more core network nodes.

The network 110 can also include Local Area Network (LAN), e.g., Ethernet or Wireless LAN (WLAN or WiFi), Near Field Communication (NFC) network, Bluetooth, or any communication networks.

Turning to a general description, an electronic device, e.g., the electronic device 102, may include, without limitation, any of the following: computing device, mobile device, mobile electronic device, user device, mobile station, subscriber station, portable electronic device, mobile communications device, wireless modem, wireless terminal, television, printer or other peripheral, vehicle, or any other electronic device capable of sending and receiving data. Examples of a mobile device may include, without limitation, a cellular phone, personal data assistant (PDA), smart phone, laptop, tablet, personal computer (PC), pager, portable computer, portable gaming device, wearable electronic device, health/medical/fitness device, camera, or other mobile communications devices having components for communicating voice or data via a wireless communication network. The wireless communication network may include a wireless link over at least one of a licensed spectrum and an unlicensed spectrum. The term "mobile device" can also refer to any hardware or software component that can terminate a communication session for a user. In addition, the terms "user equipment," "UE," "user equipment device," "user agent," "UA," "user device," and "mobile device" can be used synonymously herein.

In operation, the electronic device 102 can establish a connection 120 with the application server 104 over the network 110. The electronic device 102 can determine a security strength level for the connection 120. The electronic device 102 can generate and output a notification that indicates the security strength level of the connection. FIGS. 2-8 and associated descriptions provide additional details of these implementations.

Figure 2:
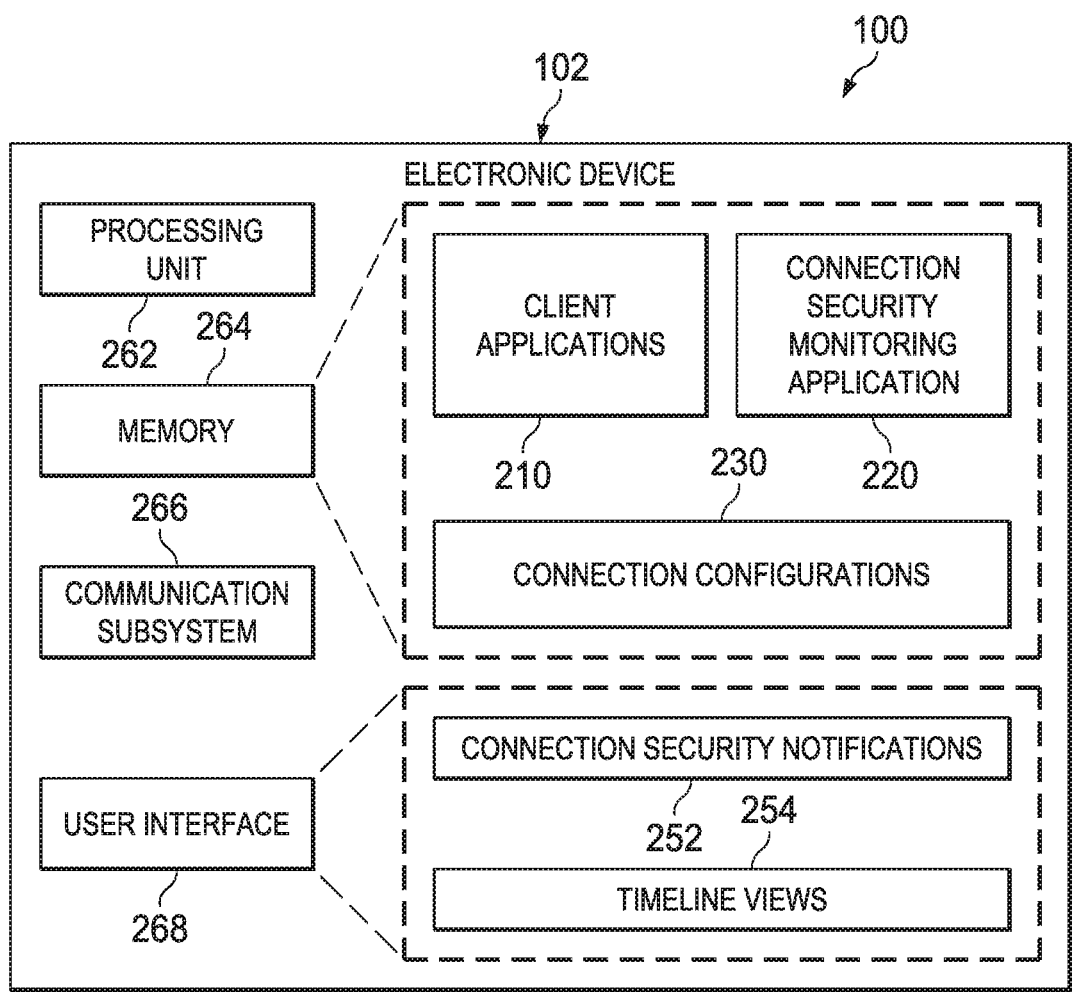
FIG. 2 is a schematic diagram showing the electronic device that monitors the security strength of a connection according to an implementation.

While elements of FIG. 1 are shown as including various component parts, portions, or modules that implement the various features and functionality, nevertheless these elements may instead include a number of sub-modules, third-party services, components, libraries, and such, as appropriate. Furthermore, the features and functionality of various components can be combined into fewer components as appropriate. FIGS. 2-3 and associated descriptions provide additional details of these implementations.

FIG. 2 is a schematic diagram 200 showing the electronic device 102 that monitors the security strength of a connection according to an implementation. The electronic device 102 includes a processing unit 262, a communication subsystem 266, a user interface 268, and a memory 264. An electronic device may include additional, different, or fewer features, as appropriate.

The example processing unit 262 can include one or more processing components (alternatively referred to as "processors" or "central processing units" (CPUs)) configured to execute instructions related to one or more of the processes, steps, or actions described above, in connection with one or more of the implementations disclosed herein. In some implementations, the processing unit 262 can be configured to generate control information, such as a measurement report, or respond to received information, such as control information from a network node. In some cases, the processing unit 262 can also be configured to make a radio resource management (RRM) decision, such as cell selection/reselection information or trigger a measurement report. The processing unit 262 can also include other auxiliary components, such as random access memory (RAM) and read-only memory (ROM).

The example communication subsystem 266 can be configured to provide wireless or wireline communication for data or control information provided by the processing unit 262. The communication subsystem 266 can include, for example, one or more antennas, a receiver, a transmitter, a local oscillator, a mixer, and a digital signal processing (DSP) unit. In some implementations, the communication subsystem 266 can support multiple-input and multiple-output (MIMO) transmissions. In some implementations, the receivers in the communication subsystem 266 can be an advanced receiver or a baseline receiver. Two receivers can be implemented with identical, similar, or different receiver processing algorithms.

The example user interface 268 can include, for example, any of the following: one or more of a display or touch screen display (for example, a liquid crystal display (LCD), a light emitting display (LED), an organic light emitting display (OLED), or a micro-electromechanical system (MEMS) display), a keyboard or keypad, a trackball, a speaker, or a microphone. As shown in FIG. 2, the example user interface 268 can be configured to output one or more connection security notifications 252. The connection security notifications 252 can include user interface objects that indicate the security strength levels of one or more connections. The example user interface 268 can also be configured to output one or more timeline views 254. The one or more timeline views 254 can include user interfaces that indicate the security strength levels of a plurality of connections in a monitoring period. FIGS. 3-8 and associated descriptions provide additional details of these implementations.

The example memory 264 can be a computer-readable storage medium on the electronic device 102. Examples of the memory 264 include volatile and non-volatile memory, magnetic media, optical media, random access memory (RAM), read-only memory (ROM), removable media, and others. The memory 264 can store an operating system (OS) of electronic device 102 and various other computer-executable software programs for performing one or more of the processes, steps, or actions described above.

As shown in FIG. 2, the example memory 264 includes client applications 210. The client applications 210 include non-browser applications that can be configured to initiate connections to one or more application servers over a network. Examples of the client applications 210 can include programs, modules, scripts, processes, or other non-browser applications. The client applications 210 can include native applications in the operating system, enterprise applications administrated by an employer of a user, or third-party applications downloaded by the user.

The example memory 264 also includes one or more connection configurations 230. The one or more connection configurations 230 can include connection parameters that can be used to establish connections over a network. The one or more connection configurations 230 can also include security configurations for establishing the connections over the network. The security configurations can include authentication configurations, encryption configurations, or a combination thereof. The security configurations can also include configured security strength levels associated with the client applications 210. FIG. 3 and associated descriptions provide additional details of these implementations.

The example memory 264 also includes a connection security monitoring application 220. The connection security monitoring application 220 represents an application, set of applications, software, software modules, hardware, or combination thereof that can be configured to monitor security strength levels of one or more connections. FIGS. 3-8 and associated descriptions provide additional details of these implementations. In some cases, the connection security monitoring application 220 can be implemented as part of the operating system of the electronic device 102. Alternatively or in combination, the connection security monitoring application 220 can be implemented as a stand-alone application or as part of a security management application that runs on the electronic device 102. FIG. 4 and associated descriptions provide additional details of these implementations.

FIG. 3 is a flow diagram showing an example process 300 for monitoring the security strength of a connection according to an implementation. The process 300 can be implemented by an electronic device, e.g., the electronic device 102 shown in FIGS. 1-2. The process 300 shown in FIG. 3 can also be implemented using additional, fewer, or different entities. Furthermore, the process 300 shown in FIG. 3 can also be implemented using additional, fewer, or different operations, which can be performed in the order shown or in a different order.

The example process 300 begins at 302, where a request to connect to an application server is received from a client application operating on an electronic device. The client application can be an extension of the operating system running on the electronic device, an app that is downloaded or pushing to the electronic device, or any other non-browser application. The client application can execute in the foreground, the background, or a combination thereof when the request is generated. In some cases, the request can be triggered by the client application to obtain a service from the application server. In some cases, the request can be received by a network connection module operating on the electronic device. The network connection module can manage the connections to devices other than the electronic device over a communication network.

From 302, the process 300 proceeds to 304, where a connection is initiated between the electronic device and the application server in response to the request. In some cases, the electronic device can establish the connection with the application server according to one or more connection configurations associated with the client application. The one or more connection configurations can include connection parameters that can be used to establish connections. The connection parameters can include the Internet Protocol (IP) address of the application server, Domain Name Server (DNS) associated with the application server, user credentials, e.g., username and password associated with the client application, or any other information.

The one or more connection configurations can also include one or more security configurations. Examples of the security configurations can include authentication configurations, encryption configurations, or any other configurations. In one example, the security configurations can include an authentication configuration that requires a mutual authentication procedure to be performed before the connection is established. The authentication configuration can further define one or more security protocols be used to perform the mutual authentication procedure. Examples of the security protocols can include, without limitation, any current or future version of any of the following: the Transport Layer Security (TLS) protocol, the SSL (Secure Sockets Layer) protocol, the OpenSSL protocol, and the BoringSSL protocol. In this or other examples, the application server and the client application can provide their respective certificates to each other for validation. If the certificates are validated, the connection can be established. If the certificates cannot be validated, the connection will fail.

In another example, the security configurations can include an encryption configuration that requires the packets to be transmitted for the connection to be encrypted. The encryption configuration can further require a level of encryption to be used, e.g., 128-bit encryption. The encryption configure can also specify one or more ciphering algorithms that can be used to perform the encryption. Examples of the ciphering algorithms can include one or more algorithms included in the TLS, SSL, OpenSSL, BoringSSL, or other security protocols, e.g., a cipher suite. A cipher suite generally refers to a named combination of authentication, encryption, message authentication code (MAC) and key exchange algorithms used to negotiate the security settings for a network connection using the Transport Layer Security (TLS)/Secure Sockets Layer (SSL) network protocol. For example, a reference for named cipher suites is provided in the TLS Cipher Suite Registry at https://www.iana.org/assignments/tls-parameters.xhtml#tls-parameters-4, the contents of which are incorporated herein by reference. Various publications e.g., NIST SP 800-131A Revision 1 which can be found at http://dx.doi.org/10.6028/NIST.SP.800-131Ar1, the contents of which are incorporated herein by reference, provide recommendations on the use of stronger cryptographic keys and more robust algorithms.

From 304, the process 300 proceeds to 306, where a security strength level associated with the connection is determined. In some cases, as discussed above, a network connection module can be configured to manage connections for applications operating on the electronic device. The network connection module can keep track of the characteristics of the connection between the electronic device and the application server. The characteristics can include the time when the connection is made, the duration of the connection, the security strength level of the connection, and other information associated with the connection.

The security strength level can include the strength level for the authentication procedure of the connection, the strength level for the encryption techniques used for the connection, or any other strength level associated with a security characteristic of the connection.

In one example, the security strength level of a connection can be determined based on a type of certificate used for the authentication procedure in establishing the connection. In some cases, as discussed previously, the application server can provide its certificate to the electronic device for validation during the authentication procedure. The certificate can be a domain-validated (DV) certificate. The DV certificate is an X.509 digital certificate typically used when the identity of the certificate holder has been validated by proving a control over a domain. The issuance of a DV certificate does not assure that any particular legal entity is connected to the certificate, even if the domain name may imply that a particular legal entity controls the domain. Alternatively, the certificate can also be an Extended Validation (EV) certificate. The EV certificate can be issued by a certificate authority (CA) that passes an independent qualified audit review. To issue an EV certificate to an application server, the CA validates the legal identity of the application server, that the application server is the domain name owner or has exclusive control over the domain name, and confirms the identity and authority of the individuals operating the application server. The EV certificate has a stronger security than the DV certificate. The certificate can also be an Organization Validation (OV) certificate, whose strength falls between that of EV and DV. To issue an OV to an application server, the CA can validate that the application server has the right of the applicant to use the domain name and conduct some vetting of the organization. The security strength level of a connection can be determined based on the certificate offered by the application server during the authentication procedure.

Alternatively or in combination, the security strength level of a connection can be determined based on the strength of the encryption used for the connection. For example, the connection can use no encryption, 128-bit encryption, or 256-bit encryption, or other types of encryption, each providing a different level of security strength.

In some cases, the security strength level of a connection can be determined to be one of multiple levels. The multiple levels can include strong, moderate, weak, or any additional level. Each security strength level can include one or more security strength attributes that represent the security strength level of a respective security characteristic. For example, a strong security strength level can include a first security attribute indicating an EV certificate, a second security attribute indicating a 256-bit encryption, or a combination thereof. A weak security strength level can include a first security attribute indicating a DV certificate, a second security attribute indicating a no encryption, or a combination thereof. The multiple levels can be configured, updated, or a combination thereof, by a user, a manufacturer, or a system administrator associated with the electronic device.

In some cases, the security strength level can be determined based on an aggregated security score. The aggregated security score can be calculated based on one or more factors. The factors can include the type of certificate, the strength level of encryption, the type of security algorithms used in encryption or authentication process, or any other factors that are associated with the security strength of a connection. The aggregated security score can be calculated based on individual security score corresponding to each factor.

In some cases, the security strength level of a connection can be determined based on a comparison of the current security strength level of the connection and a configured security strength level associated with the client application. In one example, a minimum level of security strength and a threshold level of security strength can be configured for the client application to communicate with the application server. The minimum level of security strength can include a DV certificate and a 128-bit encryption. The threshold level of security strength can include an EV certificate and a 256-bit encryption. If the security characteristics of the connection do not meet the minimum level, the connection fails. If the security characteristics of the connection is between the minimum and the threshold level, the security strength level of the connection can be determined to be weak. If the security characteristics of the connection meets the threshold level, the security strength level of the connection can be determined to be strong.

From 306, the process 300 proceeds to 308, where a notification indicating the security strength level of the connection is generated. In some cases, the notification can be represented by a graphic user interface (GUI) object. FIG. 5 illustrates an example GUI object 500 indicating the security strength level according to an implementation. The GUI object 500 includes a security strength scale 510. The security strength scale 510 includes three portions: a strong security strength portion 512, a moderate security strength portion 514, and a weak security strength portion 516. In some cases, different visual attributes can be used to indicate the strength level of each portion. For example, the weak security strength portion 516 can be filled in a red color; the moderate security strength portion 514 can be filled in a yellow color; and the strong security strength portion 512 can be filled in a green color. Alternatively in combination, other combinations of color, or other visual attributes, e.g., shape, size, or other types of visual representations, can be used to indicate different security strength levels.

The GUI object 500 also includes a pointer 520 that points to one portion on the security strength scale 510 to indicate the security strength level of the connection. In the illustrated example, the pointer 520 points to the strong security strength portion 512, indicating that the security level of the connection is strong.

Other user interface objects can also be used to indicate the security strength level of the connection. For example, the notification can be represented as a circle, a rectangle, a dialogue box, a button, a text string, or any other user interface objects. One or more visual attributes, e.g., color, shape, size, text, font, or any other visual representations, can be used in association with the user interface object to indicate the security strength level of the connection.

In some cases, the GUI object 500 can include one or more user interface objects that represent the individual security score, the aggregated security score or a combination thereof.

Figure 6:
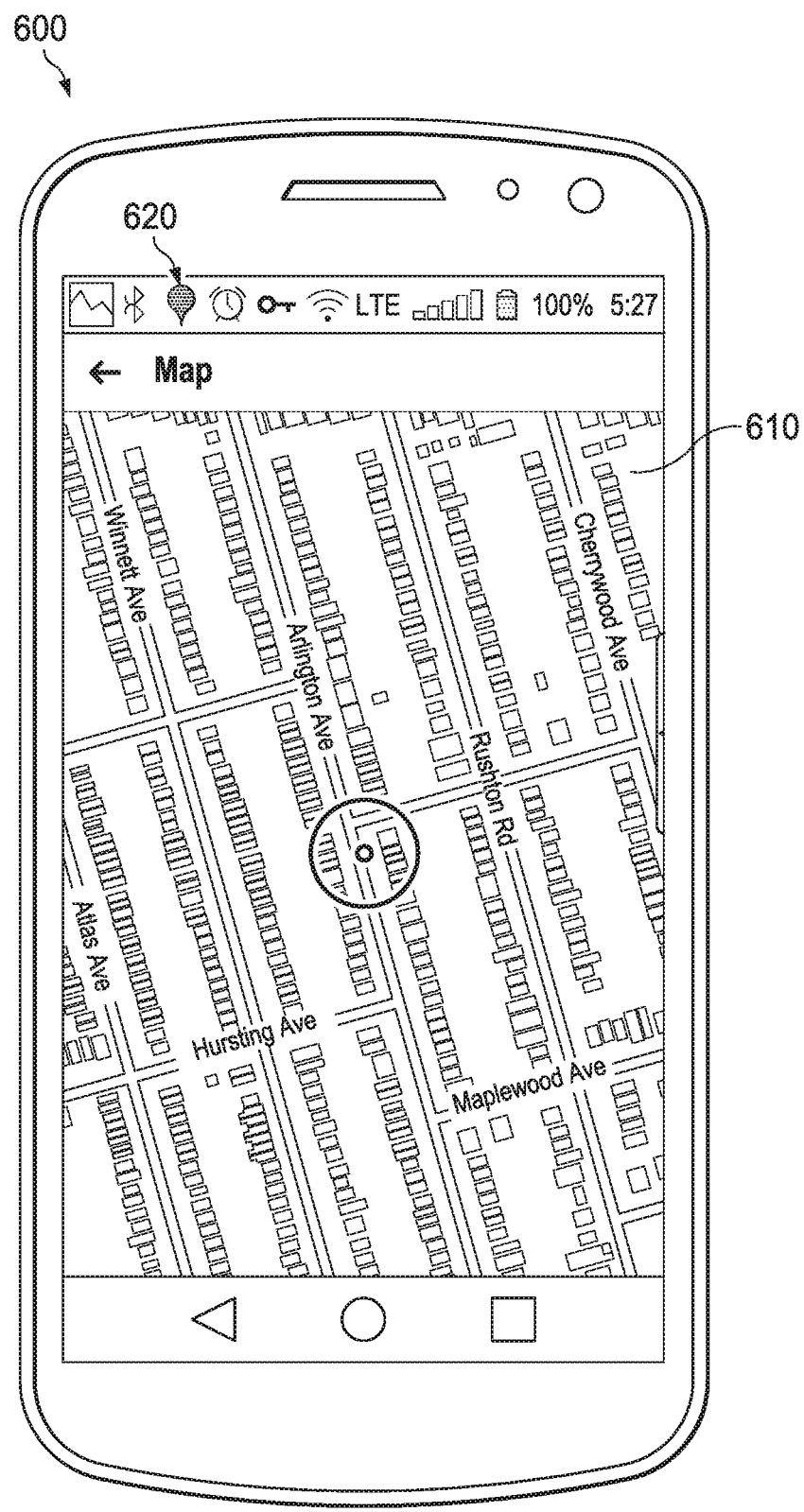
FIG. 6 illustrates an example user interface indicating a security strength status according to an implementation.

In some cases, the user interface object indicating the status of security level of a connection, e.g., the GUI object 500 or other user interface object discussed previously, can be outputted on the electronic device. FIG. 6 illustrates an example user interface 600 indicating a security strength status according to an implementation. In the illustrated example, a location app is executing on the electronic device. A map 610 is outputted in the user interface 600 by the location app. The user interface 600 also includes a security strength status user interface object 620. As illustrated, the security strength status user interface object 620 is positioned on the top bar of the user interface 600, along with the user interface objects that indicate the type of connection, the battery status, the time, and other information. Alternatively or in combination, the security strength status user interface object 620 can be positioned at any other location in the user interface 600.

In some cases, the security strength status user interface object 620 can indicate the security strength level of the connection used by the foreground application, e.g., the location app, executing on the electronic device. Alternatively or in combination, the security strength status user interface object 620 can indicate the security strength level of the connection used by a background application executing on the electronic device. In some cases, more than one application, e.g., a foreground application and one or more background applications, are making connections to respective application servers concurrently. In these or other cases, the security strength status user interface object 620 can indicate a combined security strength level of the multiple connections. For example, the security strength status user interface object 620 can indicate a weak security strength, e.g., using a red color, if at least one of the multiple connections has a weak security strength.

In some cases, a user can select the security strength status user interface object 620 to obtain detailed information of the security characteristic of the connection. When the user selects the security strength status user interface object 620, a different user interface can be outputted to display the detailed information. The detailed information can include the identity of the application server, the certificate offered by the application server, the security protocol used for the connection, the encryption level used for the connection, or any combinations thereof. In some cases, the selection can be performed by tapping, swiping, clicking, touching, or by any other user interface actions.

In some cases, the security strength of multiple connections in a monitoring period can be monitored and recorded. In some implementations, a security management application can be executed on an electronic device to track security related operations. The security management application can monitor one or more security sensors that are associated with respective security related operations. Examples of the security related operations include accesses to one or more particular resources, e.g., camera, microphone, location determination module, and files, on the electronic device. In some cases, the one or more security sensors can also include a security sensor that is associated with connection security strength. Therefore, the security management application can collect and output the information of the security strength for multiple connections in a monitoring period.

FIG. 4 is a flow diagram showing an example process 400 for monitoring the security strength of connections made in a monitoring period according to an implementation. The process 400 can be implemented by an electronic device, e.g., the electronic device 102 shown in FIGS. 1-2. The process 400 shown in FIG. 4 can also be implemented using additional, fewer, or different entities. Furthermore, the process 400 shown in FIG. 4 can also be implemented using additional, fewer, or different operations, which can be performed in the order shown or in a different order.

The example process 400 begins at 402, where a monitoring period for monitoring connections associated with a client application is determined. In some cases, the monitoring period can be configured, updated, or a combination thereof by a system administrator, a user, a manufacturer associated with the electronic device, or a combination thereof. In some cases, default monitoring periods can be set by an operating system of the electronic device. The default monitoring periods can be changed by a system administrator, a user of the electronic device, or a combination thereof. In some cases, more than one monitoring periods, e.g., a day, a week, and a month, can be configured.

From 402, the process 400 proceeds to 404, where a plurality of connections between the electronic device and the application server for the client application are initiated during the monitoring period. In some cases, a system administrator, a user of the electronic device, or a combination thereof can configure one or more client applications whose connections are monitored. In some cases, the operating system can set by default one or more client applications to monitor. A system administrator, a user of the electronic device, or a combination thereof can add, remove, or change the client applications to be monitored.

From 404, the process 400 proceeds to 406, where a security strength level associated with each of the plurality of connections is determined. As described previously, the security strength level can be weak, moderate, strong, or any other levels. In some cases, additional information associated with each connection can be collected. Examples of the additional information can include whether the client application that makes the connection is operating in the foreground or in the background when the connection is made, the location of the electronic device when the connection is made, the time when the connection is initiated, and the duration of the connection.

Figure 7:
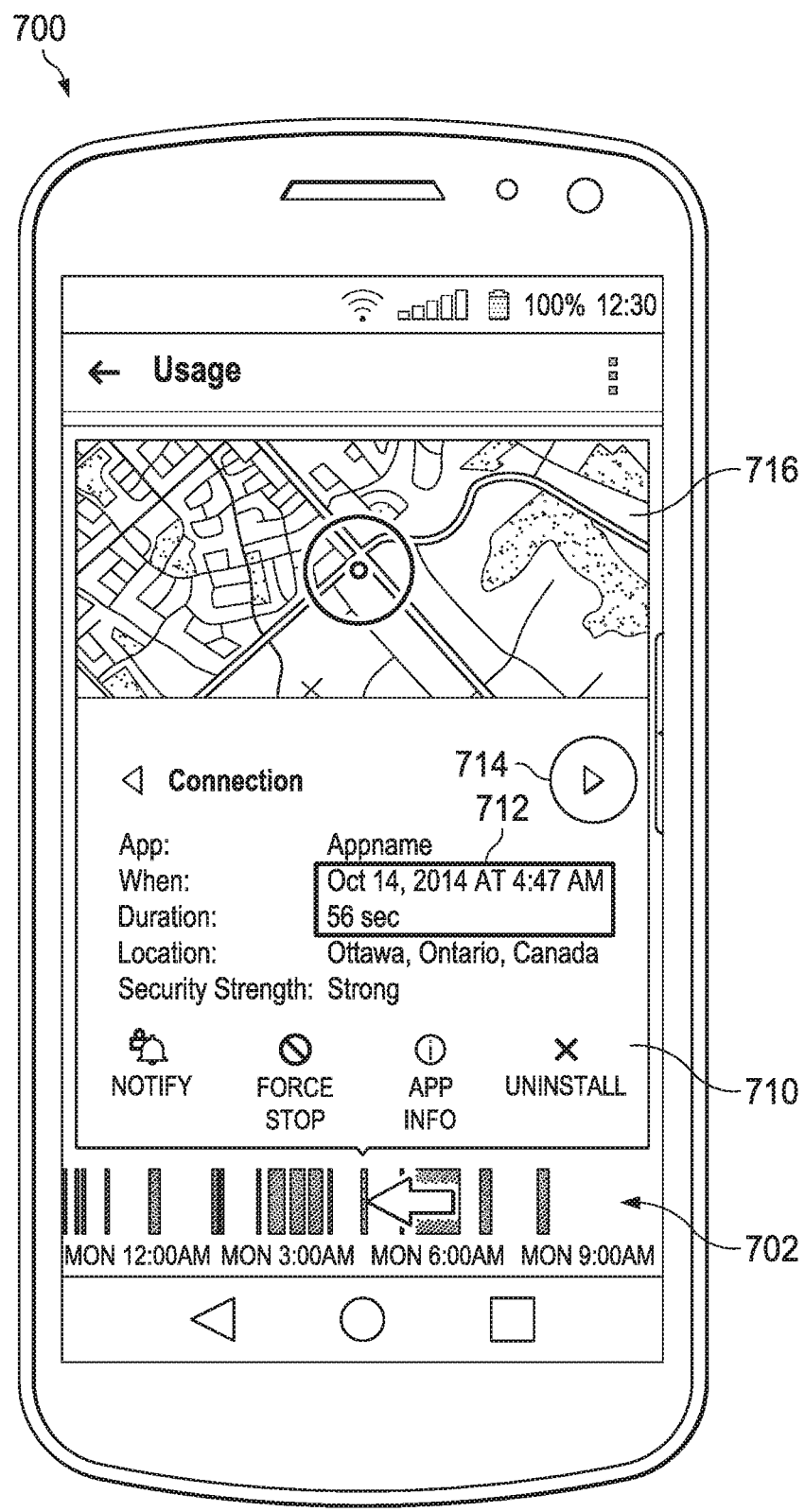
FIG. 7 shows an example graphic user interface outputting a timeline view of the connection security strength according to an implementation.

From 406, the process 400 proceeds to 408, where a graphic user interface is outputted on the electronic device. The graphic user interface includes a plurality of graphic user interface objects. Each of the graphic user interface objects indicates a determined security strength level associated with one of the plurality of connections. FIG. 7 shows an example graphic user interface 700 outputting a timeline view of the connection security strength according to an implementation. The graphic user interface 700 shows the number of times connections have been made during a monitoring period.

The graphic user interface 700 includes a timeline section 702. The timeline section 702 includes a plurality of vertical bars, each representing one connection. The timeline section 702 also includes a time scale that indicates the time duration of the monitoring period. The time scale includes labels showing different times within the 24 hours, e.g., 12 AM, 3 AM, 6 AM, 9 AM, etc. As shown in FIG. 7, each vertical bar that represents a respective connection is located on a position that corresponds to the time when the connection is made. This approach provides an intuitive representation of the patterns of the connections. For example, the bars are sparsely located between 12 AM to 3 AM, but densely located around 6 AM, showing that connections are rarely made during 12 AM to 3 AM, but frequently around 6 AM. In some cases, the graphic user interface 700 can provide a zoomed view in response to user actions. For example, if a user selects a portion in the timeline section 702, the corresponding portion can be zoomed in. The selection can be made by tapping, swiping, clicking, touching, or any other user actions interacting with the user interface of the electronic device. In one example, the user can swipe the bars located around 6 AM, the graphic user interface 700 can present a zoomed-in view in response. The zoomed-in view can enlarge the timescale around 6 AM and therefore show in more detail different connections in that portion of time period.

The graphic user interface 700 also includes an individual connection section 710. The individual connection section 710 can display detailed information associated with an individual connection. For example, as shown in FIG. 7, the individual connection section 710 shows the name of the client application that makes a connection on Oct. 14, 2014 at 4:47 AM. The individual connection section 710 includes a time section 712 that displays the time, duration, location, and the security strength level of the connection. The individual connection section 710 also includes a map section 716 that displays the location of the electronic device when the connection is made.

In some cases, the graphic user interface 700 can enable the user to traverse the individual connections displayed in the timeline section 702. For example, the graphic user interface 700 includes a forward button 714. When the user selects the forward button 714, detailed information associated with the next connection can be displayed in the individual connection section 710. In some cases, a user can select a bar in the timeline section 702. In response, detailed information associated with the connection corresponding to the selected bar can be displayed in the individual connection section 710. Other user actions, e.g., scrolling and dragging, can also be used to change the connection that is displayed in the individual connection section 710.

Figure 8:
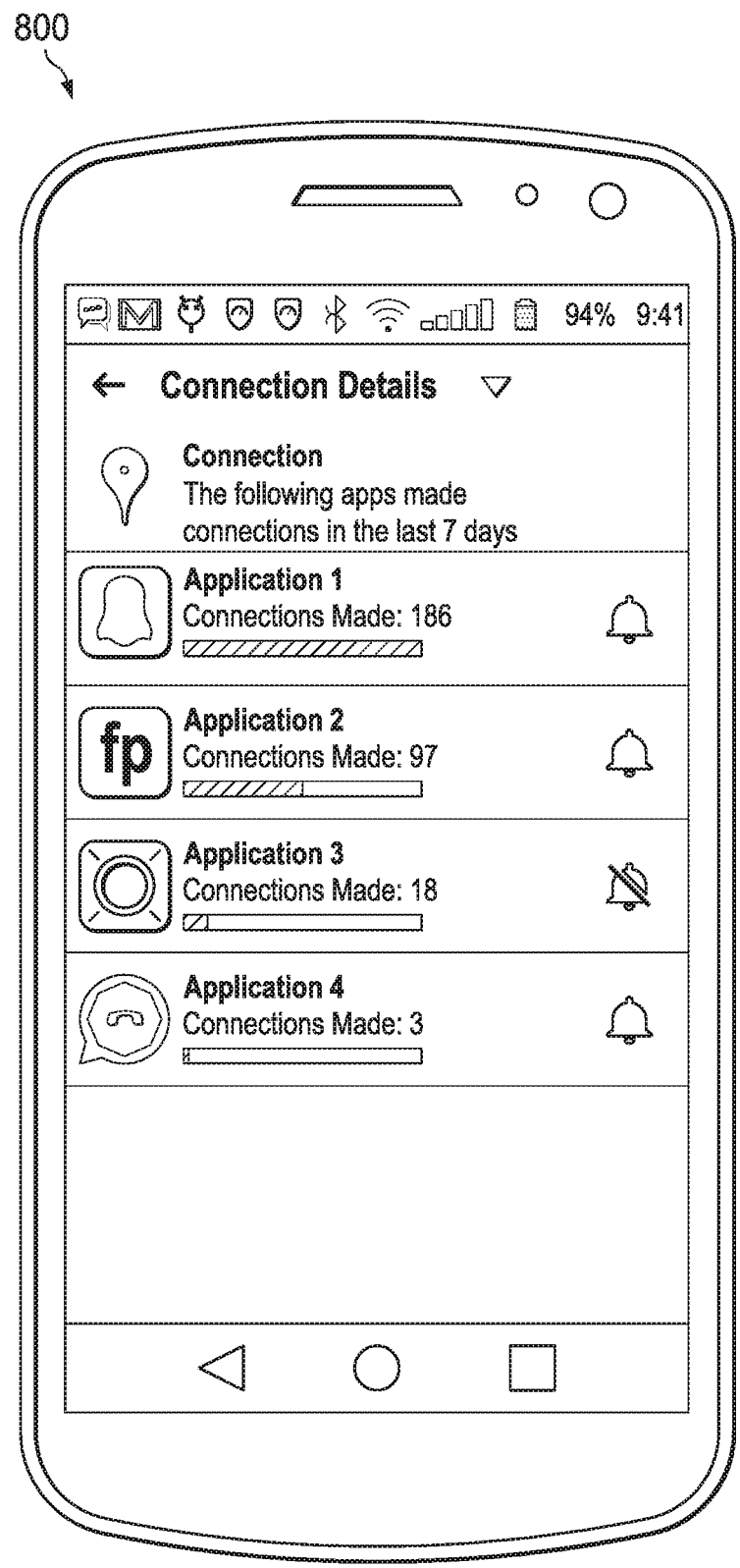
FIG. 8 shows an example graphic user interface outputting the number of connections according to an implementation.

In some cases, the number of connections made by one or more client applications within a monitoring period can be outputted. FIG. 8 shows an example graphic user interface 800 outputting the number of connections according to an implementation. As shown in FIG. 8, the graphic user interface 800 displays the number of times four client applications made connections in a particular time period, e.g., the last 7 days. A graphic user interface object, e.g., a horizontal bar, is used to show the number of connections relative to the client application that made the most connections. As shown in FIG. 8, Application 1, 2, 3, and 4 made 186, 97, 18, and 3 connections, respectively, during the particular time period.

In some cases, an alarm can be configured for one or more client applications making connections. If the alarm is configured, a user interface object, e.g., an icon, a box, or a sound, can be outputted on the electronic device indicating that the client application is attempting to make a connection with a security strength level below a configured security strength level, e.g, using an unencrypted socket connection or using a low level encryption algorithm. As shown in FIG. 8, a bell can be used to show whether the alarm is configured for a respective client application. If a bell is clear, the alarm is set. If a bell has a cross, the alarm is not set. Other user interface, e.g., color, shading, size, or any combinations thereof, can be used to indicate whether the alarm is set. In some cases, a user can select the bell to set or unset the alarm.

In some cases, one or more types of connections can be configured for a client application. For example, a client application can be configured to use WiFi, Bluetooth, NFC, cellular network, or any combinations thereof. The client application can be prevent from making a connection using a type of connection that is not configured for the client application. Alternatively or in combination, an alarm can be outputted if the client application attempts to make a connection using a type of connection that is not configured for the client application.

Some of the subject matter and operations described in this disclosure can be implemented in digital electronic circuitry, or in computer software, firmware, or hardware, including the structures described in this disclosure and their structural equivalents, or in combinations of one or more of them. Some of the subject matter described in this disclosure can be implemented as one or more computer programs, i.e., one or more modules of computer program instructions, encoded on a computer storage medium for execution by, or to control the operation of, data-processing apparatus. Alternatively or in addition, the program instructions can be encoded on an artificially generated propagated signal, for example, a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data-processing apparatus," "computer," or "electronic computer device" encompass all kinds of apparatus, devices, and machines for processing data, including, by way of example, a programmable processor, a computer, a system on a chip, or multiple ones, or combinations of the foregoing. The apparatus can include special purpose logic circuitry, e.g., an FPGA (field programmable gate array) or an ASIC (application specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable, conventional operating system.

A computer program, which may also be referred to or described as a program, software, a software application, a module, a software module, a script, or code, can be written in any form of programming language, including compiled or interpreted languages, or declarative or procedural languages, and can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site, or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

Some of the processes and logic flows described in this disclosure can be performed by one or more programmable processors, executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory, or both. A processor can include by way of example a programmable processor, a computer, a system on a chip, or multiple ones, or combinations of the foregoing. A processor can include special purpose logic circuitry, e.g., an FPGA (field programmable gate array) or an ASIC (application specific integrated circuit).

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices, for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including, by way of example, semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry. In some cases, the computer storage medium can be transitory, non-transitory, or a combination thereof.

To provide for interaction with a user, implementations of the subject matter described in this disclosure can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to, and receiving documents from a device that is used by the user, for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this disclosure can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this disclosure, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system, or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware or software (or a combination of hardware and software), may interface with each other or the interface using an application programming interface (API) or a service layer (or a combination of API and service layer). The API may include specifications for routines, data structures, and object classes. The API may be either computer language, independent or dependent, and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this disclosure contains many specific implementation details, these should not be construed as limitations on the scope of any invention or on the scope of what may be claimed, but rather as descriptions of features that may be specific to particular implementations of particular inventions. Certain features that are described in this disclosure in the context of separate implementations can also be implemented, in combination, or in a single implementation. Conversely, various features that are described in the context of a single implementation can also be implemented in multiple implementations, separately, or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the computer-readable medium.

What is claimed is:

1. A method, comprising:
    receiving, from a client application operating on an electronic device, a request to connect to an application server;
    in response to the request, initiating a connection between the electronic device and the application server;
    determining, by a hardware processor on the electronic device, a security strength level associated with the connection, wherein the security strength level is determined based on a type of certificate provided by the application server for establishing the connection, and the type of certificate is at least one of domain-validated (DV), Extended Validation (EV), or Organization Validation (OV);
    generating, by the hardware processor, a notification indicating the security strength level of the connection;
    outputting, by the hardware processor, the notification on the electronic device;
    determining a monitoring period for monitoring connections associated with the client application;
    initiating a plurality of connections between the electronic device and the application server for the client application within the monitoring period;
    for each of the plurality of connections, determining a security strength level associated with the respective connection; and
    outputting, on the electronic device, a graphic user interface, wherein the graphic user interface includes a plurality of graphic user interface objects, each of the plurality of graphic user interface objects indicates a determined security strength level associated with a corresponding connection among the plurality of connections.

2. The method of claim 1, wherein the security strength level is determined further based on an encryption technology used by the connection.

3. The method of claim 1, further comprising:
    comparing the determined security strength level with a configured security strength level associated with the client application;
    determining a visual attribute based on the comparing; and
    wherein the notification is outputted by using the visual attributes.

4. The method of claim 1, further comprising:
    outputting, on the electronic device, at least one of a time, a location, or a duration of at least one of the plurality of connections.

5. An electronic device, comprising:
    at least one hardware processor; and
    a computer-readable storage medium coupled to the at least one hardware processor and storing programming instructions for execution by the at least one hardware processor, the programming instructions instruct the at least one hardware processor to:
    receive, from a client application operating on the electronic device, a request to connect to an application server;
    in response to the request, initiate a connection between the electronic device and the application server;
    determine a security strength level associated with the connection wherein the security strength level is determined based on a type of certificate provided by the application server for establishing the connection, and the type of certificate is at least one of domain-validated (DV), Extended Validation (EV), or Organization Validation (OV);
    generate a notification indicating the security strength level of the connection;
    output the notification on the electronic device;
    determine a monitoring period for monitoring connections associated with the client application;
    initiate a plurality of connections between the electronic device and the application server for the client application within the monitoring period;
    for each of the plurality of connections, determine a security strength level associated with the respective connection; and
    output, on the electronic device, a graphic user interface, wherein the graphic user interface includes a plurality of graphic user interface objects, each of the plurality of graphic user interface objects indicates a determined security strength level associated with a corresponding connection among the plurality of connections.

6. The electronic device of claim 5, wherein the security strength level is determined further based on an encryption technology used by the connection.

7. The electronic device of claim 5, wherein the programming instructions instruct the at least one hardware processor to:
    compare the determined security strength level with a configured security strength level associated with the client application;
    determine a visual attribute based on the comparing; and
    wherein the notification is outputted by using the visual attributes.

8. The electronic device of claim 5, wherein the programming instructions instruct the at least one hardware processor to:
    output, on the electronic device, at least one of a time, a location, or a duration of at least one of the plurality of connections.

9. A non-transitory computer-readable medium storing instructions which, when executed, cause an electronic device to perform operations comprising:
    receiving, from a client application operating on the electronic device, a request to connect to an application server;
    in response to the request, initiating a connection between the electronic device and the application server;

determining a security strength level associated with the connection, wherein the security strength level is determined based on a type of certificate provided by the application server for establishing the connection, and the type of certificate is at least one of domain-validated (DV), Extended Validation (EV), or Organization Validation (OV);

generating a notification indicating the security strength level of the connection;

outputting, by the hardware processor, the notification on the electronic device;

determining a monitoring period for monitoring connections associated with the client application;

initiating a plurality of connections between the electronic device and the application server for the client application within the monitoring period;

for each of the plurality of connections, determining a security strength level associated with the respective connection; and outputting, on the electronic device, a graphic user interface, wherein the graphic user interface includes a plurality of graphic user interface objects, each of the plurality of graphic user interface objects indicates a determined security strength level associated with a corresponding connection among the plurality of connections.

10. The non-transitory computer-readable medium of claim 9, wherein the security strength level is determined further based on an encryption technology used by the connection.

11. The non-transitory computer-readable medium of claim 9, the operations further comprising:

comparing the determined security strength level with a configured security strength level associated with the client application;

determining a visual attribute based on the comparing; and wherein the notification is outputted by using the visual attributes.

\* \* \* \* \*